United States Patent [19]
Le et al.

[11] Patent Number: 5,781,361
[45] Date of Patent: Jul. 14, 1998

[54] METHOD AND APPARATUS FOR GENERATING SERVO INFORMATION

[75] Inventors: Me Van Le, Milpitas; Jong-Ming Lin, Cupertino, both of Calif.

[73] Assignee: Samsung Electronics, Ltd., Suwon, Rep. of Korea

[21] Appl. No.: 641,686

[22] Filed: May 1, 1996

[51] Int. Cl.$^6$ .................................................. G11B 5/596
[52] U.S. Cl. ...................................................... 360/77.08
[58] Field of Search ........................... 360/77.01, 77.08, 360/77.02, 77.07, 78.14

[56] References Cited

U.S. PATENT DOCUMENTS

| | | | |
|---|---|---|---|
| 5,450,249 | 9/1995 | Nagaraj et al. | 360/77.02 |
| 5,608,587 | 3/1997 | Smith | 360/77.08 |

*Primary Examiner*—Andrew L. Sniezek
*Attorney, Agent, or Firm*—Blakely, Sokoloff, Taylor & Zafman

[57] ABSTRACT

A method and apparatus for generating servo information used in positioning the read head of a hard disk drive. The apparatus comprises a disk having a plurality of tracks, at least one of which has a servo field which includes four servo bits: an A bit, a B bit, a C bit and a D bit, where the A bit and the B bit have a common boundary located at the track centerline and where the C bit and the D bit have a common boundary. A servo signal based on the four servo bits is generated and used to position the head relative to a track of the disk. A servo signal may be generated from the sum of the difference between the A and B bits, and the difference between the C and D bits. An offset may be used to eliminate phase errors introduced into the servo signal. The offset may be representative of the magnitude of the difference between the C and D bits. The servo signal may also be generated from the difference of the difference between the A and B bits, and the difference between the C and D bits.

20 Claims, 11 Drawing Sheets

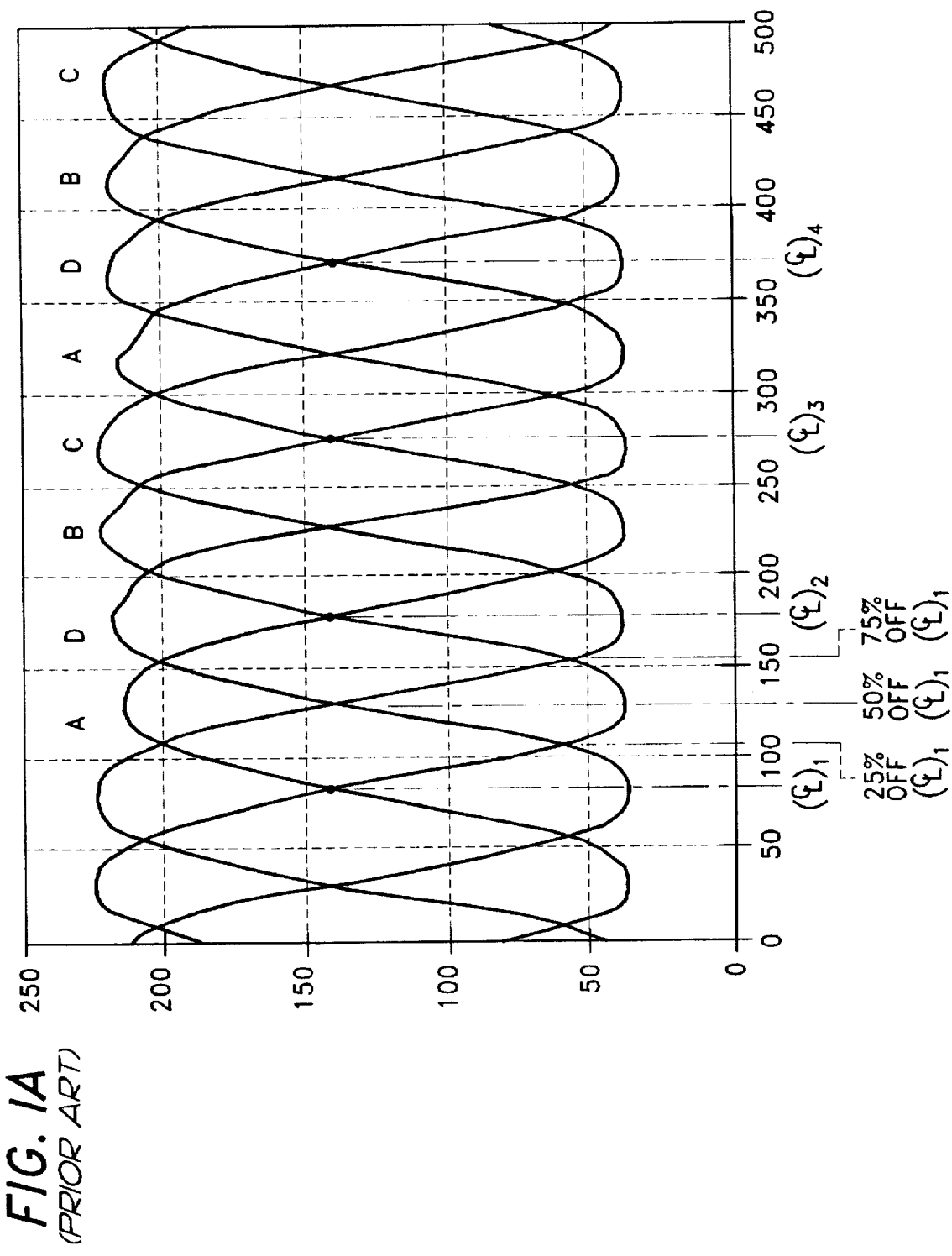
FIG. IA
(PRIOR ART)

5,781,361

METHOD AND APPARATUS FOR GENERATING SERVO INFORMATION

BACKGROUND OF THE INVENTION

1. Field of the Invention

The present invention relates in general to disk storage systems and more particularly, to a method and apparatus for generating servo information used in positioning the read head of a hard disk drive.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The raw signals produced by the servo bits are typically demodulated into a position signal which is utilized to determine the position of the head relative to the track, and to move the actuator arm if the head is not located on the track centerline.

Dual element transducers are being increasingly utilized in hard disk drives because they have greater aerial densities than single element transducers. Dual element transducers include a single write element and a separate read element which is constructed from a magneto-resistive material. Such dual element transducers are commonly referred to as magneto-resistive (MR) heads. These MR heads are typically narrow, in the order of half the width of a track.

FIG. 1A is a graph illustrating the variation of the servo burst signals A, B, C, D with respect to the position of the read head of a disk drive under near-ideal conditions. FIG. 1B is a graph illustrating the variation of the difference between servo burst signals (A-B) and (C-D) with respect to the position of the read head of a disk drive under near-ideal conditions. The variation of the servo burst signals A, B, C, D and the variation of the difference between servo burst signals (A-B) or (C-D) with respect to the position of the read head are two typical techniques used to provide correlational information between the amplitude of the position error signal and the distance between the head and the center of the track. In the first prior art technique, either of one servo burst signal, A, B, C, or D is used to provide correlational information. In the second prior art technique, two signals, (A-B) or (C-D), are used to provide correlational information. In both cases, the servo burst signals vary monotonically with the track position of the read head under near-ideal conditions. Such monotonic variation permits the servo system to correct the off-track position of the read head.

However, in most disk drives, the actual variation of the servo burst signals with respect to the track position for an MR head is non-linear in nature and varies greatly between different heads. FIG. 2A is a graph illustrating the variation of the servo burst signals A, B, C, D with respect to the position of the read head of a disk drive under actual conditions. FIG. 2B is a graph illustrating the variation of the difference between servo burst signals (A-B) and (C-D) with respect to the position of the read head of a disk drive under actual conditions. This non-linearity is especially pronounced when the MR head is 25% off the center of the track (see FIG. 2C) because at that location, the values of the servo burst signals do not vary monotonically with respect to the position of the head.

This non-monotonic variation is undesirable because it injects confusion into the servo system. This is because for every servo burst value, there are two opposite values corresponding to a single track position of the head. Thus, the servo system cannot determine the direction in which to move the actuator arm on which the head is mounted. In disk drives utilizing standard magneto-resistive heads, the non-monotonic variation is not particularly problematic because standard heads are sufficiently wide and thus adept at detecting the overall increase or decrease of the servo burst signals with respect to the track position of the head. However, in disk drives utilizing narrow magneto-resistive heads, only a limited range of the values of the servo burst signals may be detected at any particular time, so the non-monotonic variation becomes a significant problem. It can thus be seen that prior art techniques which utilize only a single servo burst signal, i.e. A, B, C or D, or that which utilizes two servo burst signals, i.e. (A-B) or (C-D), do not provide accurate position correlation information.

Accordingly, there is a need in the technology for a method and apparatus for providing servo information which varies monotonically with respect to the track position of the read head. The provision of such servo information permits accurate alignment of the read head.

BRIEF SUMMARY OF THE INVENTION

A method and apparatus for generating servo information used in positioning the read head of a hard disk drive. The apparatus comprises a disk having a plurality of tracks, at least one of which has a servo field which includes four servo bits: an A bit, a B bit, a C bit and a D bit, where the A bit and the B bit have a common boundary located at the track centerline and where the C bit and the D bit have a common boundary. A servo signal based on the four servo bits is generated and used to position the head relative to a track of the disk. A servo signal may be generated from the sum of the difference between the A and B bits, and the difference between the C and D bits. An offset may be used to eliminate phase errors introduced into the servo signal. The offset may be representative of the magnitude of the difference between the C and D bits. The servo signal may also be generated from the difference of the difference between the A and B bits, and the difference between the C and D bits.

BRIEF DESCRIPTION OF THE DRAWINGS

FIG. 1A is a graph illustrating the variation of the servo burst signals A, B, C, D with respect to the position of the read head of a disk drive under near-ideal conditions, as used in the prior art.

DETAILED DESCRIPTION OF THE INVENTION

The present invention utilizes information obtained from all four servo bits A, B, C, D to provide linear position information for aligning the head 110 instead of using only two servo signals, (A-B) or (C-D), as used in conventional techniques. This is because the simultaneous use of all four servo bits A, B, C, D results in improved linearity of the servo signal obtained.

Figure 1B:
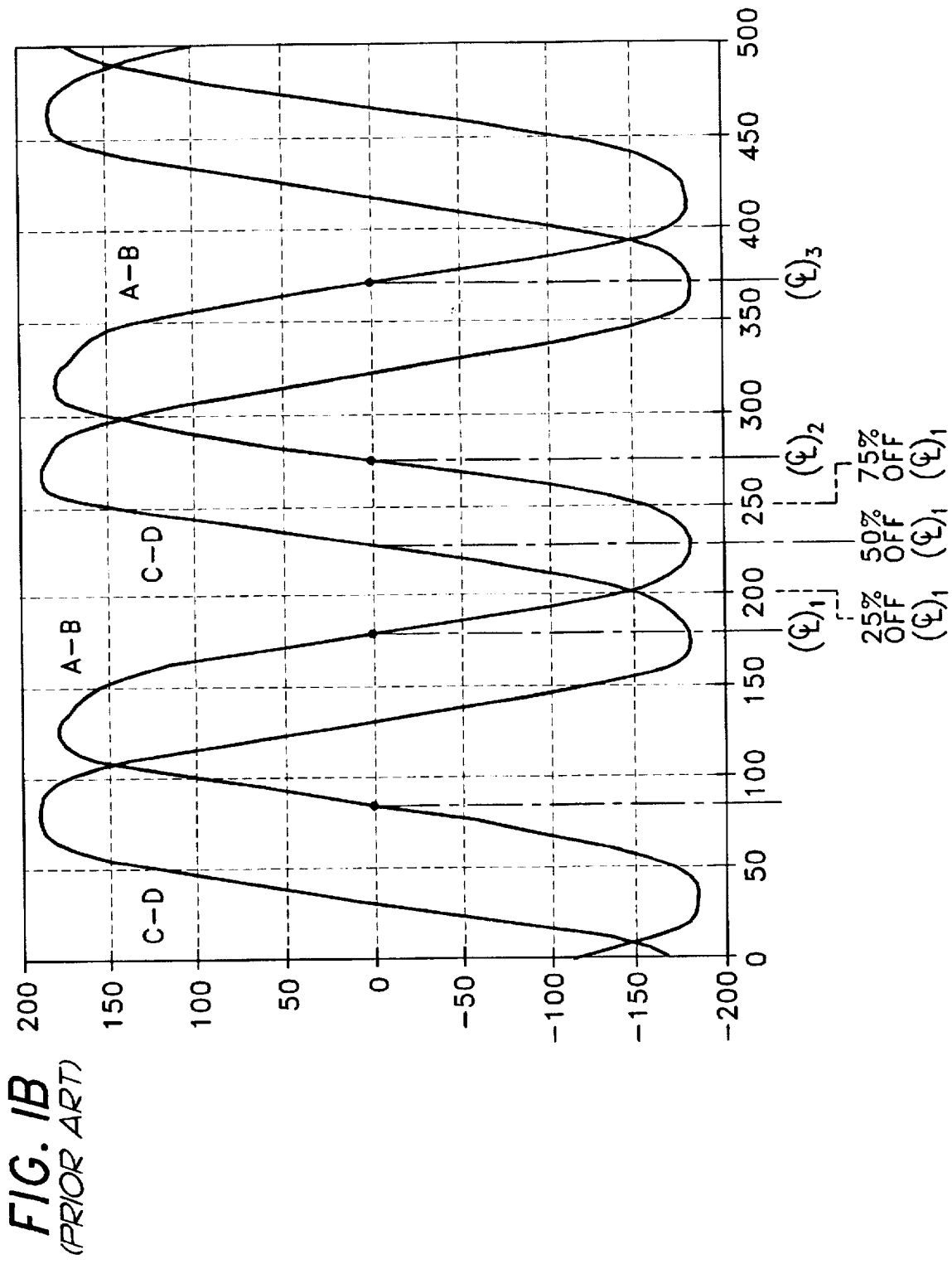
FIG. 1B is a graph illustrating the variation of the difference between servo burst signals (A-B) and (C-D) with respect to the position of the read head of a disk drive under near-ideal conditions, as used in the prior art.
Figure 2A:
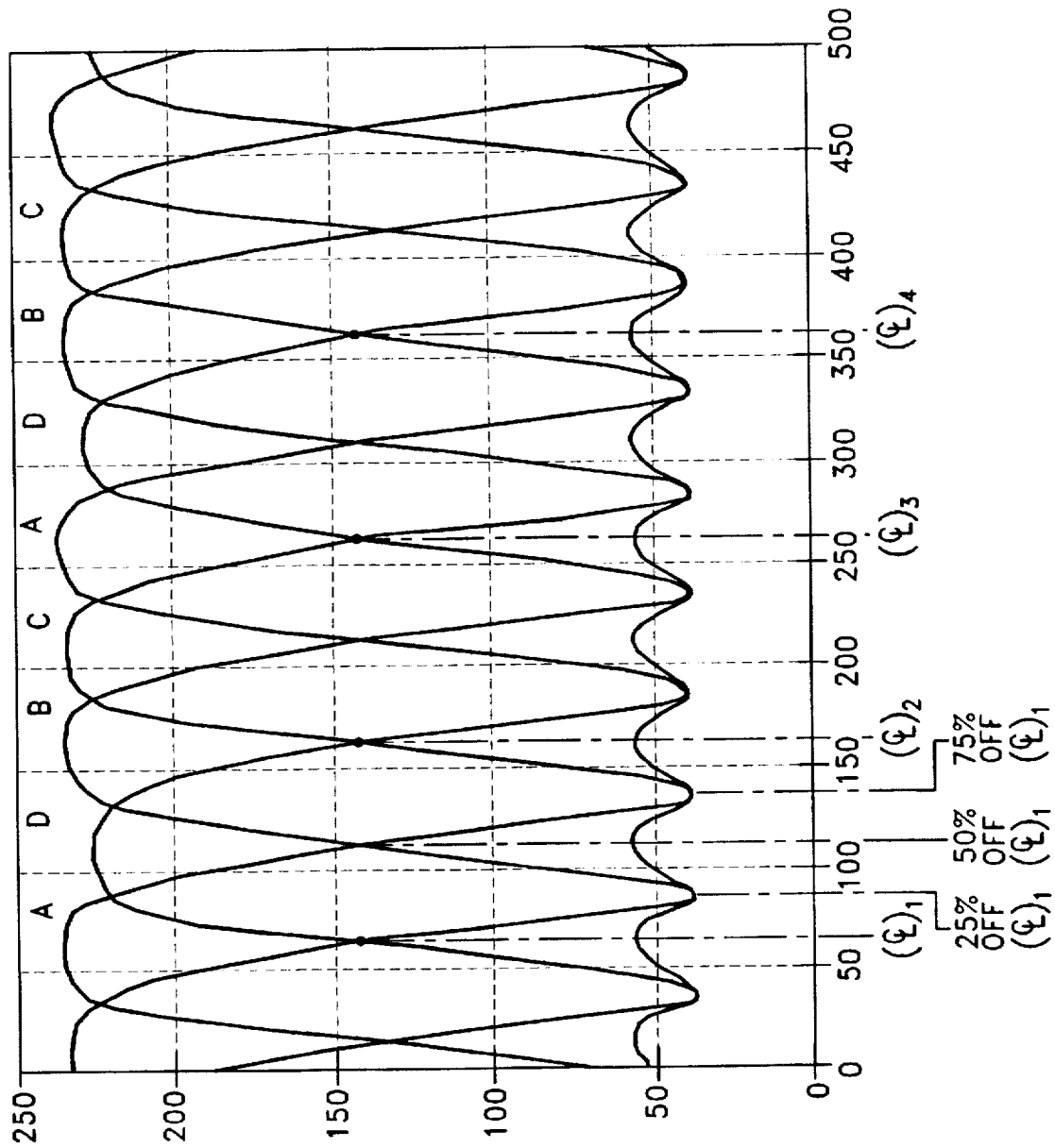
FIG. 2A is a graph illustrating the variation of the servo burst signals A, B, C, D with respect to the position of the read head of a disk drive under non-ideal conditions, as used in the prior art.
Figure 2B:
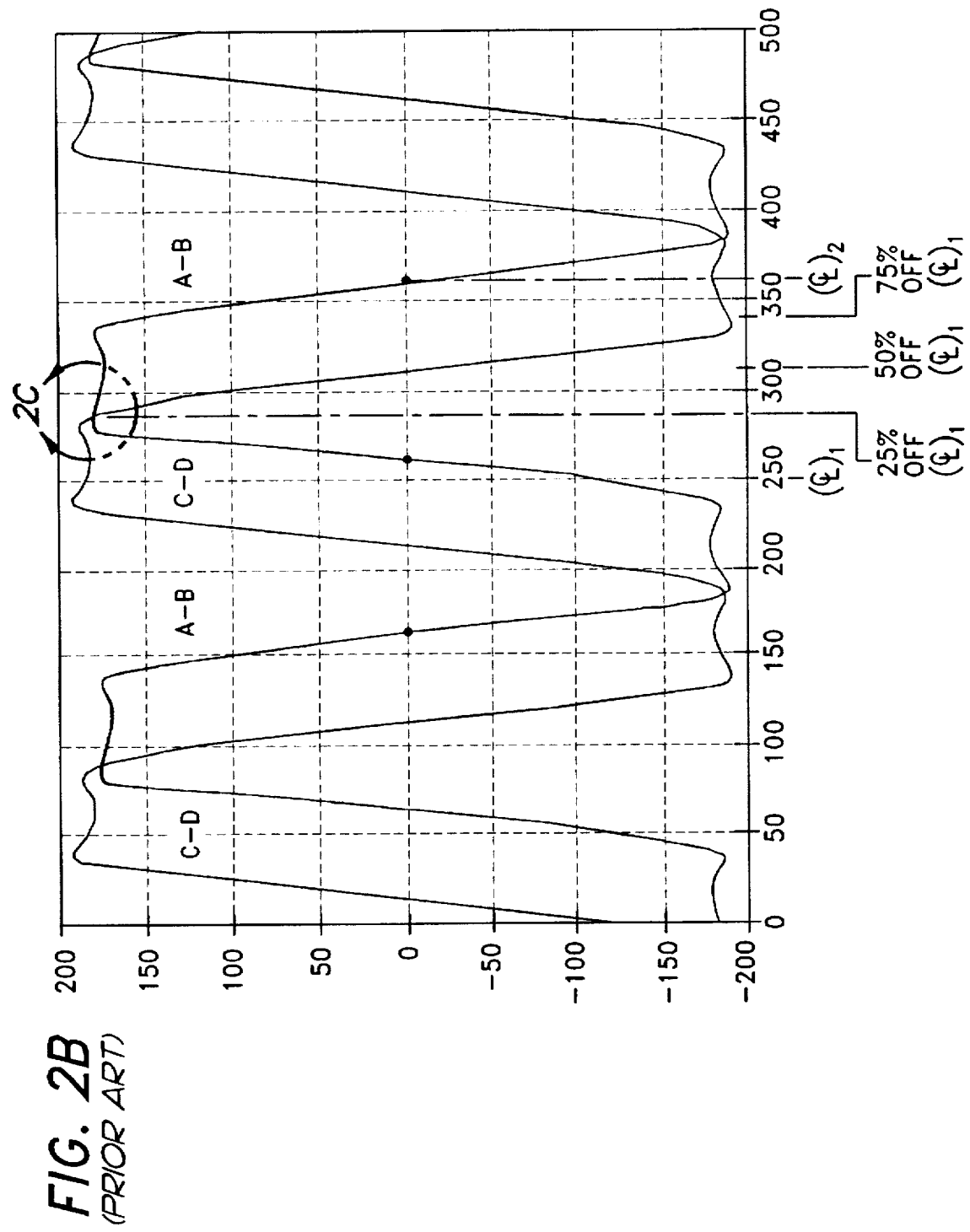
FIG. 2B is a graph illustrating the variation of the difference between servo burst signals (A-B) and (C-D) with respect to the position of the read head of a disk drive under non-ideal conditions, as used in the prior art.
Figure 2C:
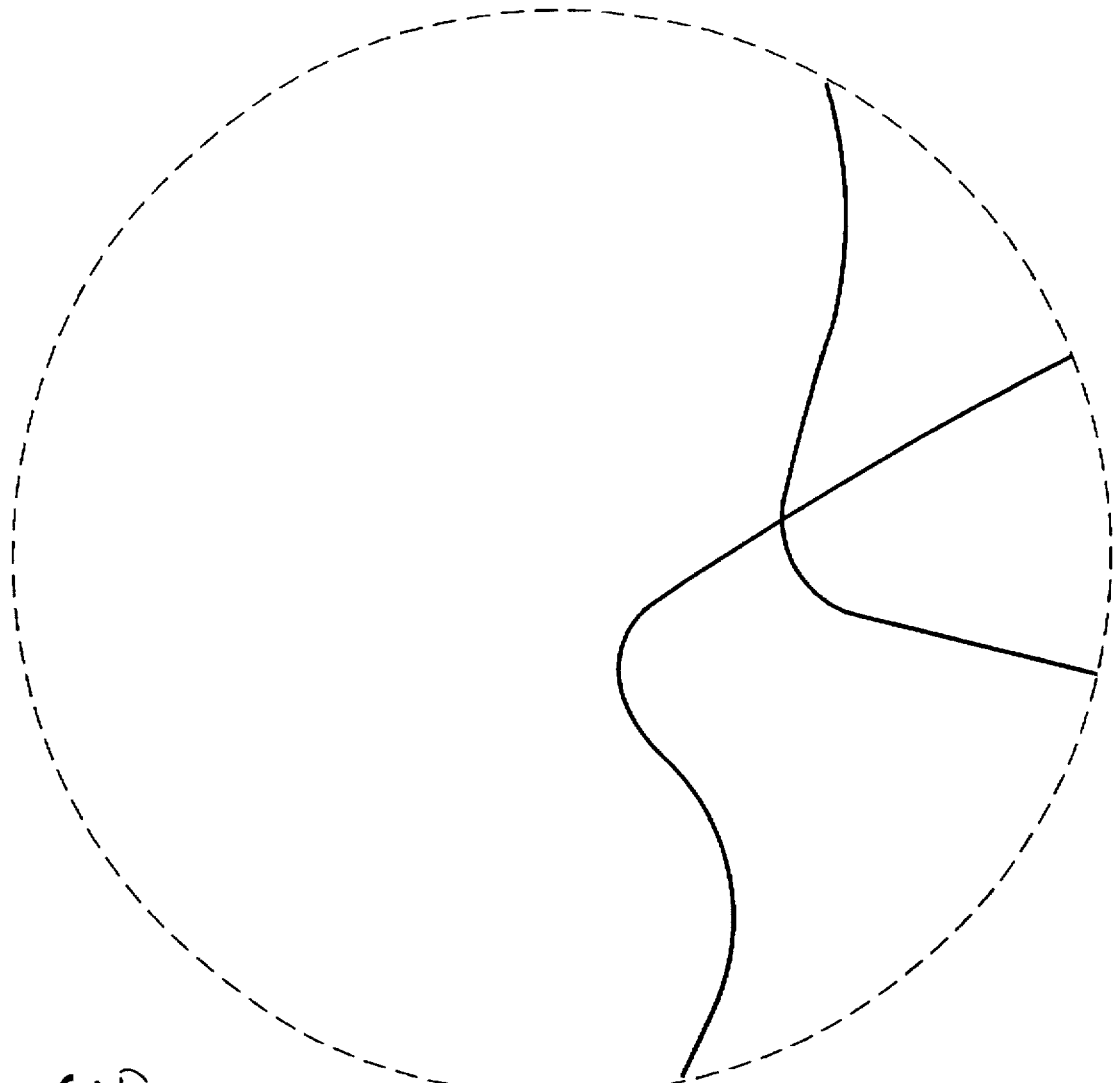
FIG. 2C is an enlarged view of a portion of FIG. 2B along line 2C, illustrating non-linearity of servo burst signals (A-B) with respect to the position of the read head when the read element is 25% off the track centerline, as used in the prior art.
Figure 3:
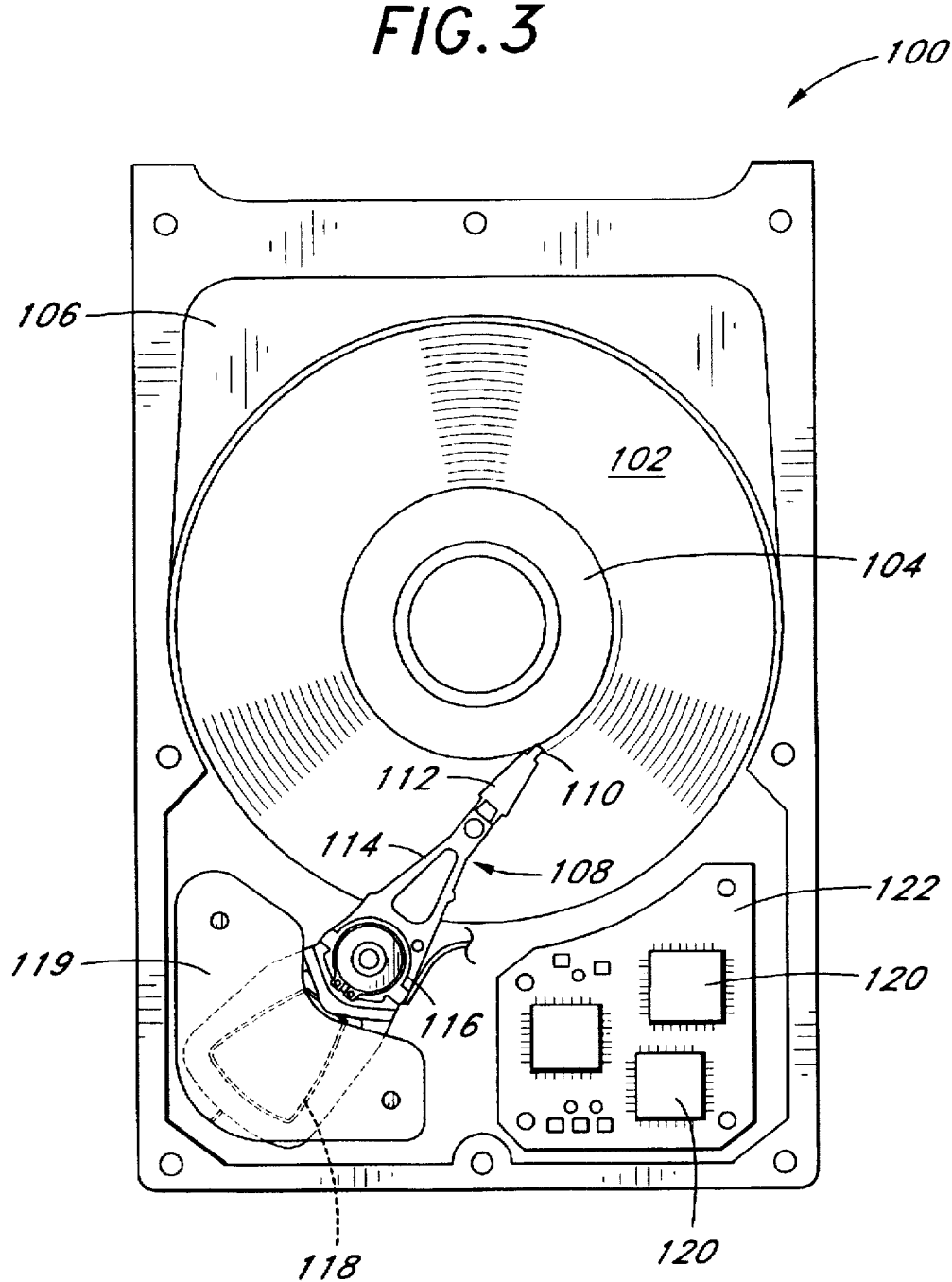
FIG. 3 illustrates a hard disk drive which utilizes the method of the present invention.

Referring to the drawings more particularly by reference numbers, FIG. 3 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil 118 that is coupled to the magnets 119 that are mounted to the base plate 106. Energizing the voice coil 118 moves the heads 110 relative to the disk 102. There is typically a single head for each disk surface. The spin motor 104, voice coil 118 and the heads 110 are coupled to a number of electronic circuits 120 mounted to a printed circuit board 122. In the following discussion, only one head 110 is referenced. The electronic circuits 120 typically include a read channel circuit, a microprocessor-based controller and a random access memory (RAM) device.

Figure 4:
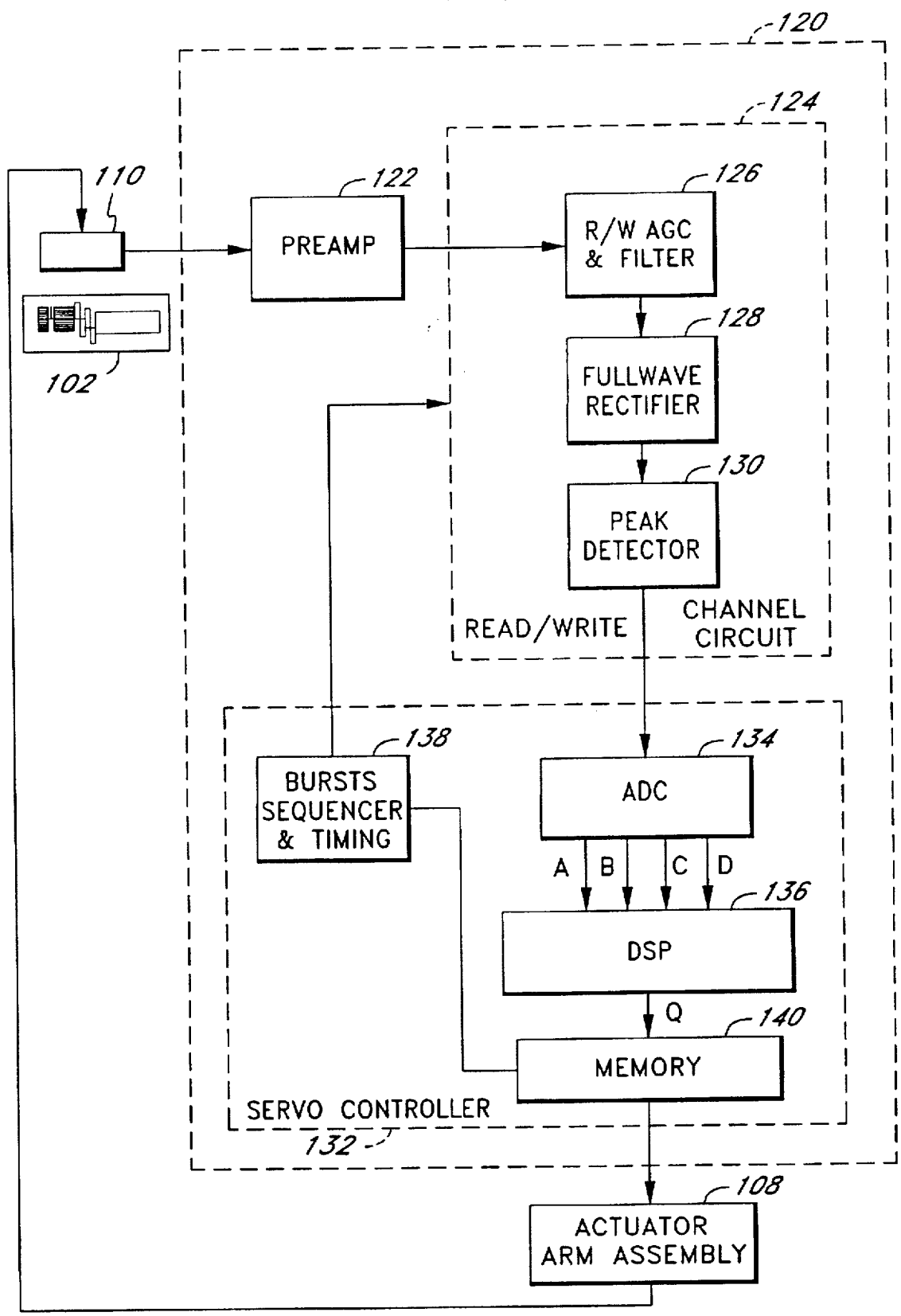
FIG. 4 is a block diagram of portions of an integrated circuit read channel in accordance with the present invention.

FIG. 4 is a block diagram of an electronic circuit 120 of the drive. The electronic circuit 120 includes a preamplifier 122 which is coupled to a read/write (R/W) channel circuit 124. The R/W channel circuit 124 includes a R/W Automatic Gain Control (AGC), a filter circuit 126, a fullwave rectifier 128 and a peak detector 130. The electronic circuit 120 further comprises a microprocessor-based servo controller 132 which includes an analog-to-digital converter (ADC) 134, a digital signal processor (DSP) 136, a burst sequencer and timing circuit 138 and a memory 140, such as a random access memory (RAM) device.

The electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier 122, and then provided to the R/W channel circuit 124. The AGC data included in the read signal is provided to the R/W AGC and filter circuit 126. The R/W AGC circuit in circuit 126 monitors the AGC data provided by the read signal and the read signal is then filtered by the filter circuit located in the R/W AGC and filter circuit 126. The fullwave rectifier 128 rectifies the read signal and provides the rectified read signal to the peak detector 130. The peak detector 130 detects the amplitude of the read signal. The read signal is then provided to the ADC 134 which provides digitized samples of the analog read signal. The digitized signal is then provided to a digital signal processor (DSP) 136 which generates Q, one of four quasi burst signals W, X, Y, Z, based on all four servo bits A, B, C, and D read by the head 110. Based on the quasi burst signal Q, the DSP 136 generates a position offset signal which is stored in memory 140 and subsequently provided to the actuator arm assembly 108 to move the heads 110. Alternatively, the quasi burst signal Q can be provided directly to the actuator arm assembly 108 to move the heads 110.

Figure 5:
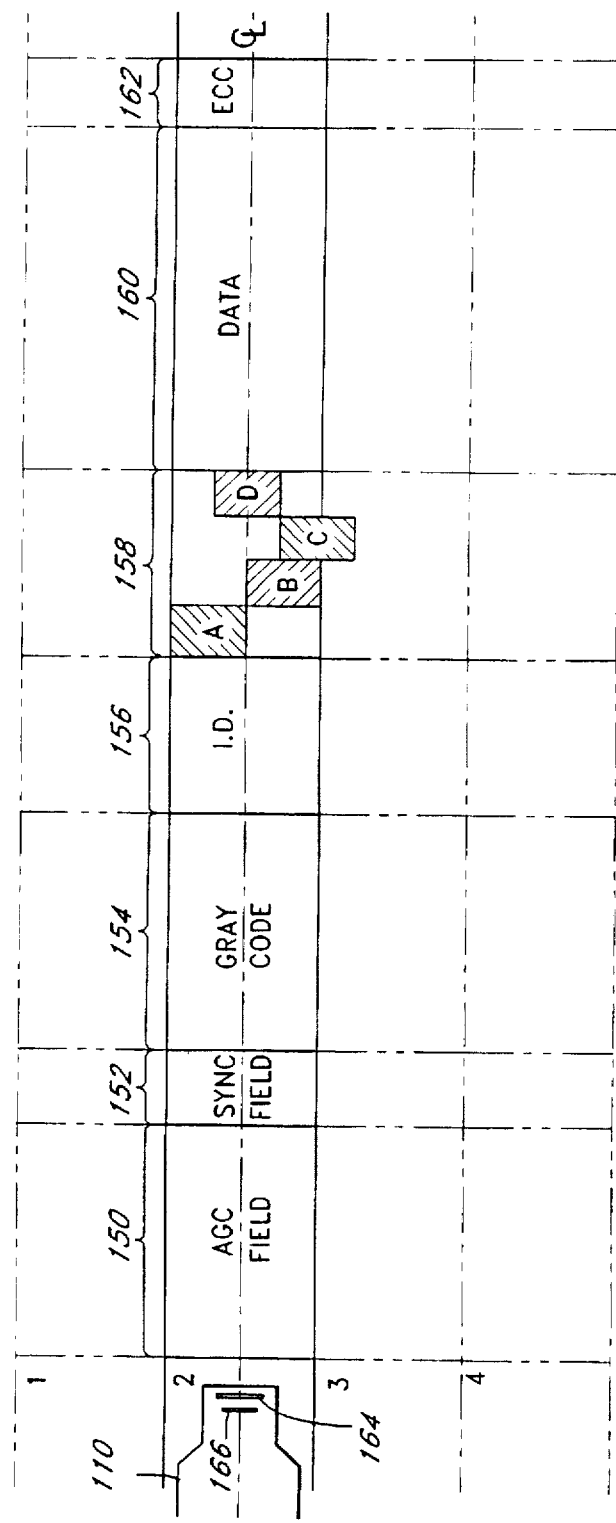
FIG. 5 illustrates the general layout of the servo field region of a track.

As shown in FIG. 5, data is typically stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains the data and an error correction code field 162. In operation, the head 110 is moved to a track and the servo information provided in servo field 158 is read and provided to the electronic circuits 120. The electronic circuits 120 utilize all four servo bits A, B, C and D to generate Q, a quasi servo burst based on the track number and track location that the head is positioned over. The information obtained from all four servo bits A, B, C, D provides improved linear position information for aligning the head 110, as compared to conventional techniques where only two servo signals, (A-B) or (C-D) are used.

Based on the quasi servo burst Q, a position offset signal is generated and used to maintain the heads 110 on the centerline CL of the track. If the heads 110 are off-center, the electronic circuits 120 will generate a position offset signal which has a voltage amplitude that varies with the distance that the heads 110 are off-set from the track centerline.

In particular, track number information located in the gray code field 154 and servo information from all four servo bits A, B, C and D located in the servo field 158 are provided to the DSP 136. Based on this information, the DSP 136 generates Q, a quasi servo burst signal according to the following expression:

$$Q = \begin{cases} Z, & \text{if track } ID \text{ is even and off-track range is}(-0\% \text{ to } -75\%) \\ W, & \text{if track } ID \text{ is even and off-track range is}(+0\% \text{ to } +75\%) \\ Y, & \text{if track } ID \text{ is odd and off-track range is}(-0\% \text{ to } -75\%) \\ X, & \text{if track } ID \text{ is odd and off-track range is}(+0\% \text{ to } +75\%) \end{cases}$$

where $Z = P + NP_{offset}$;
$W = N - NP_{offset}$;
$Y = P - NP_{offset}$;
$X = N + NP_{offset}$;

and where:

$NP_{offset} = |C-D|$;
$N = (A-B) - (C-D)$; and
$P = (A-B) + (C-D)$

The above expression is based on the nominal quadrature bursts A, B, C and D, where the signals A, B, C, and D have the same amplitude and frequency, and where the signal B is phase shifted by 180° from A, the signal C is phased shifted by 90° from A and the signal D is phased shifted by 270° from A. Each quasi burst W, X, Y and Z is corrected by the addition or subtraction of an offset, $NP_{offset}$ to eliminate phase shifts introduced during the combination of the four servo signals A, B, C and D. In one embodiment, the offset, $NP_{offset}$ is equivalent to the magnitude of the difference between the servo signals C and D. This offset value is equal to the phase shift when the head 110 is on track, i.e., when A=B.

In one embodiment, when the head 110 is located on an even track and when A-B is <0, it indicates that the head 110 is located within the off-track range of (+0% to +75%). When the head 110 is located on an even track and when A-B>0, it indicates that the head 110 is located within the off-track range of (-0% to -75%). In the same embodiment, when the head 110 is located on an odd track and A-B>0, it indicates that the head 110 is located within the range of (+0% to +75%). When the head 110 is located on an odd track and A-B<0, it indicates that the head 110 is located within the range of (-0% to -75%). The NP offset is equivalent to the value obtained.

Figure 6A:
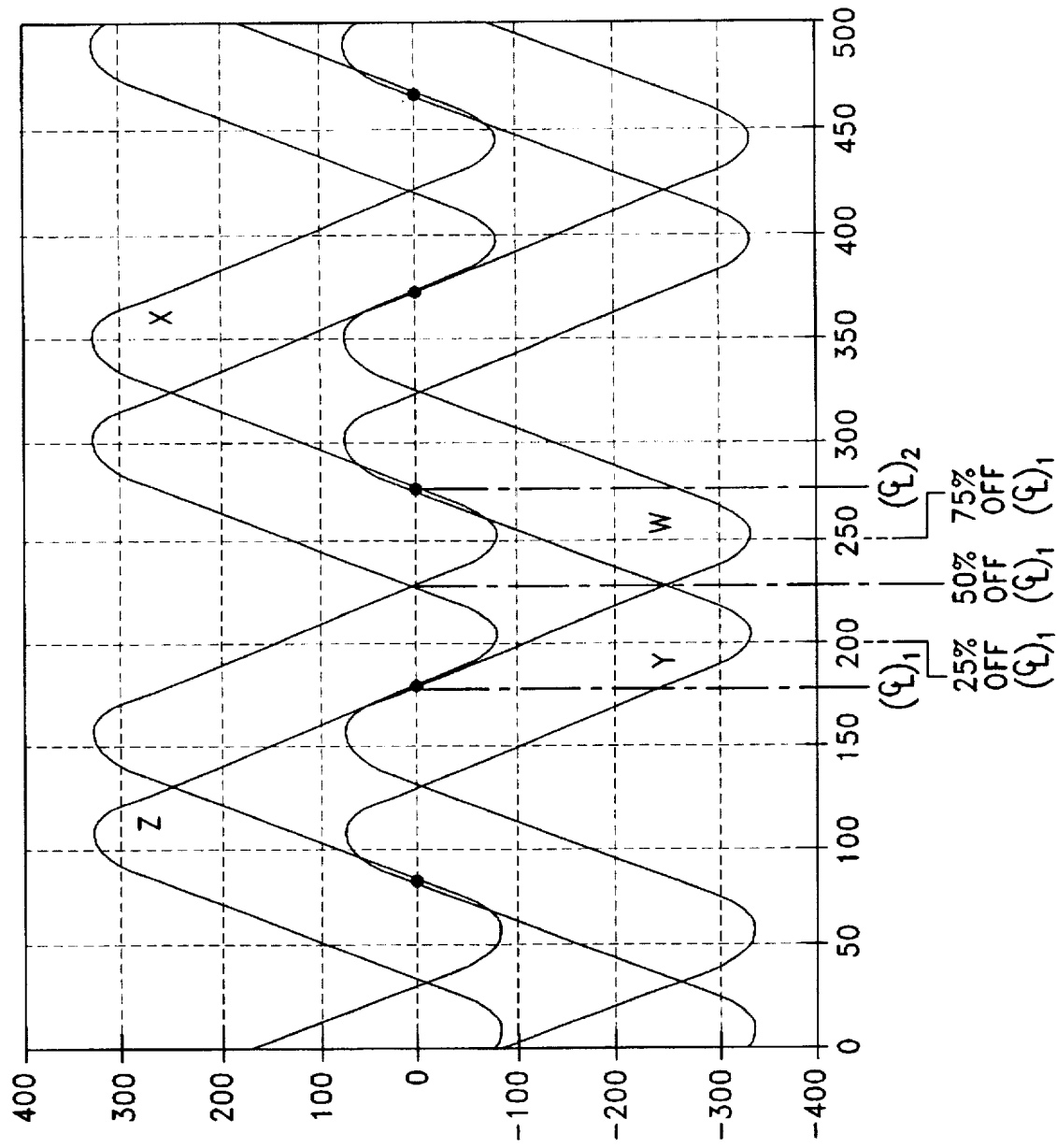
FIG. 6A is a graph illustrating the variation of the difference between servo burst signals W, X, Y, Z generated using the method of the present invention, with respect to the position of the read head of a disk drive under near-ideal conditions.
Figure 6B:
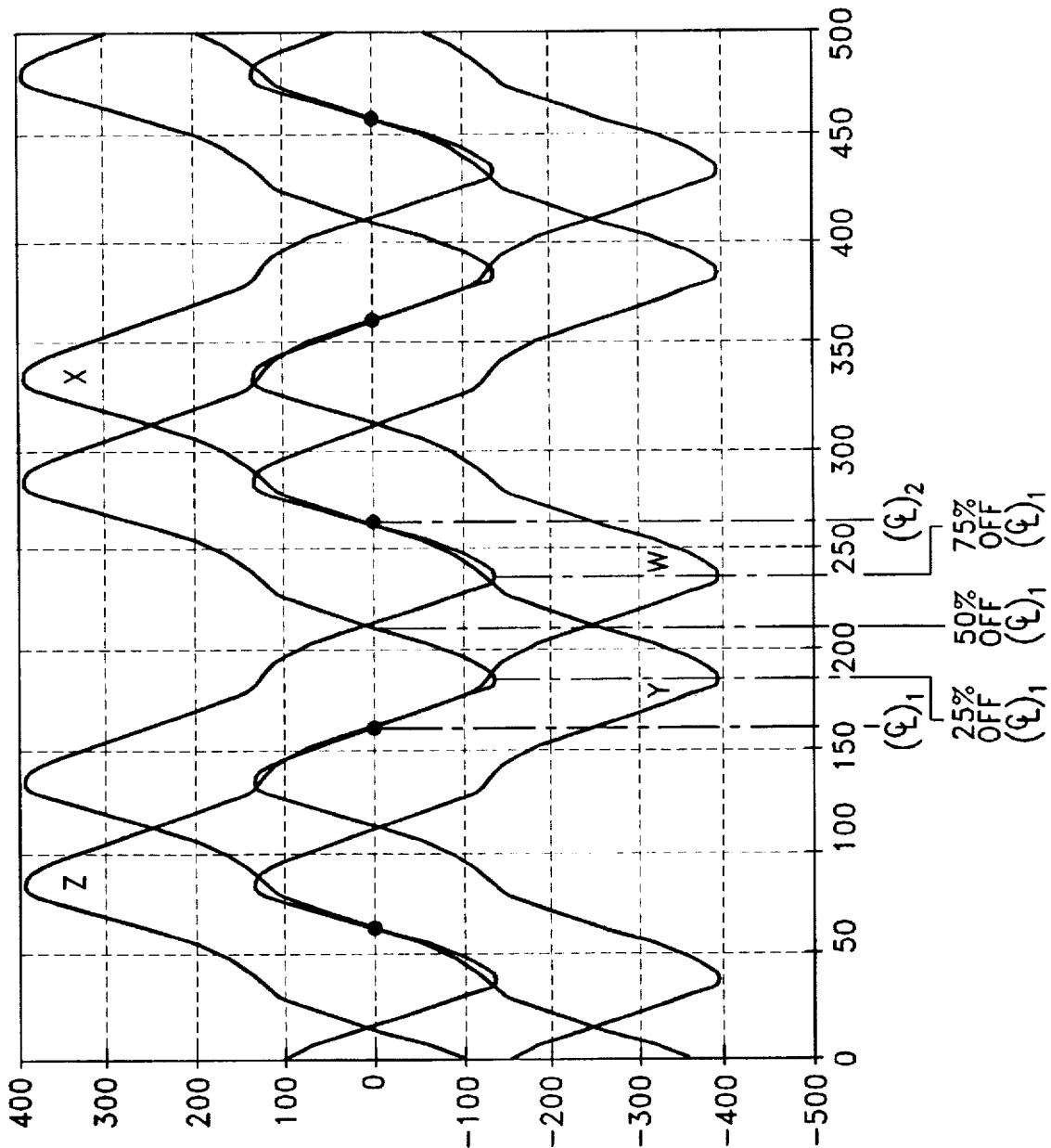
FIG. 6B is a graph illustrating the variation of the difference between servo burst signals W, X, Y, Z generated using the method of the present invention, with respect to the position of the read head of a disk drive under actual conditions.

FIG. 6A is a graph illustrating the variation of the difference between servo burst signals W, X, Y, Z generated using the method of the present invention, with respect to the position of the read head of a disk drive under near-ideal conditions. FIG. 6B is a graph illustrating the variation of the difference between servo burst signals W, X, Y, Z generated using the method of the present invention, with respect to the position of the read head of a disk drive under actual conditions. As shown, although there is still some non-linearity observed when the head 110 is 25% off track, the servo value varies monotonically with respect to the center of the track. Thus, the servo controller can respond by directing the actuator arm assembly 108 to move the head 110 in a specific direction.

Figure 7:
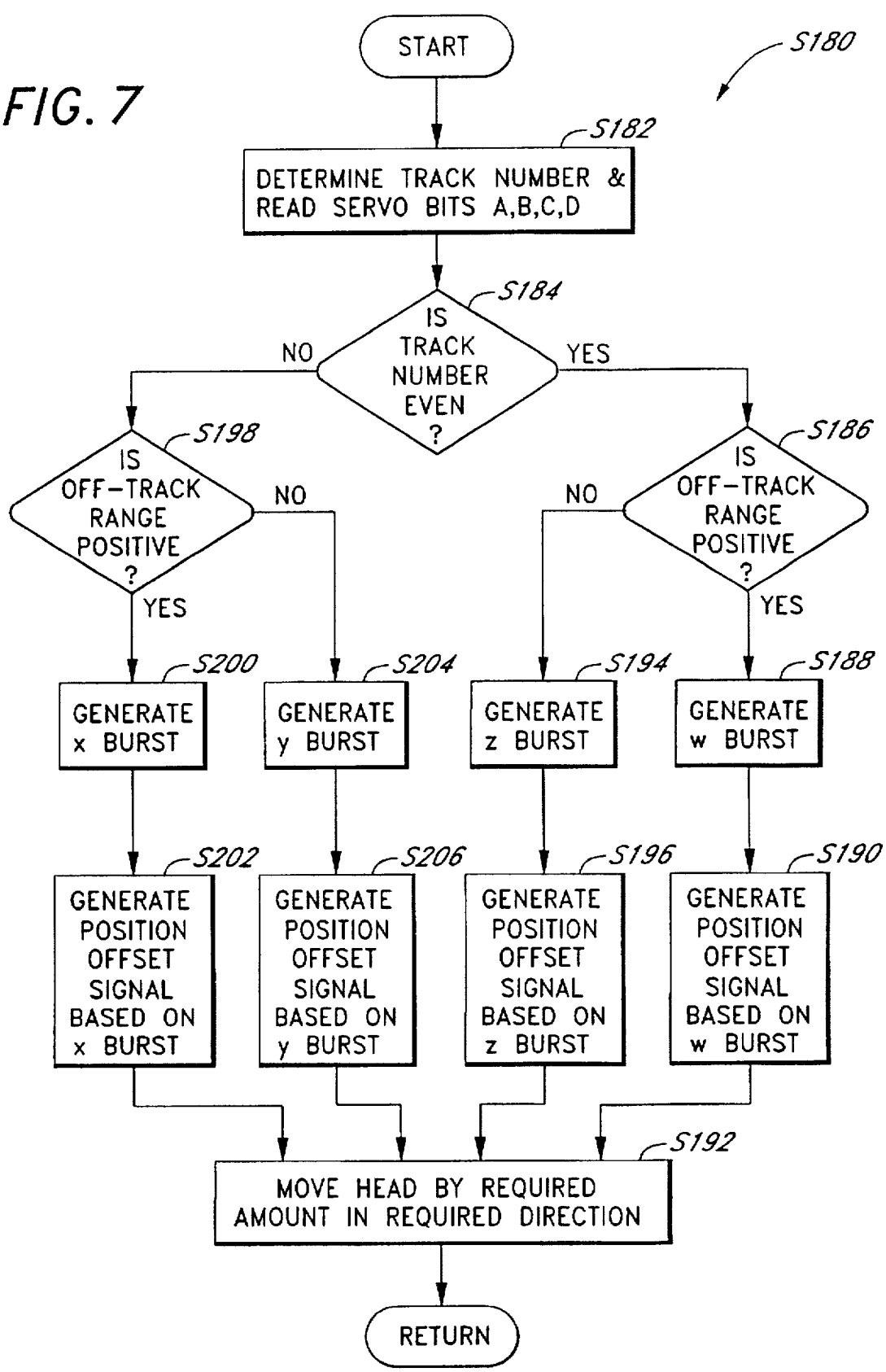
FIG. 7 is a flowchart illustrating the process of generating quasi servo bursts in accordance with the teachings of the present invention.

FIG. 7 is a flowchart illustrating the process of providing a quasi servo burst in accordance with the teachings of the present invention. Beginning from a start state, the process S180 proceeds to process step S182, where the head 110 reads the gray code from the gray code field 154 of the disk 102 to determine the track number that the head 110 is presently reading. The head 110 also reads the servo bits A, B, C, and D from the servo field 158 of the disk 102. This enables the servo controller 132 to determine if the head 110 is off the center of the track and if so, the servo controller 132 determines if the off track range is positive (for example, to the right of the centerline of the track) or negative (for example, to the left of the centerline of the track).

Upon obtaining the track number and off track range, the process 180 proceeds to decision step S184, where it queries if the track number is even. If so, the process S180 proceeds to decision step S186, where it determines if the off track range is positive. If the off track range is positive, the process S180 proceeds to process step S188, where the DSP 136 in the servo controller 132 calculates the W burst. Based on the W burst, a position offset signal is calculated by the DSP 136, as shown in process step S190. Using the position offset signal thus calculated, the servo controller 132 directs the actuator arm assembly 108 to move the head 110 in the required direction and by the calculated amount, as shown in process step S192 so that the head 110 will be centered on the track. The process S180 then terminates.

If the process S180 determines, at decision step S186 that the off track range is negative, it proceeds to process step S194, where the DSP 136 in the servo controller 132 calculates the Z burst. Based on the Z burst, a position offset signal is calculated by the DSP 136, as shown in process step S196. Using the position offset signal thus calculated, the servo controller 132 directs the actuator arm assembly 108 to move the head 110 in the required direction and by the calculated amount, as shown in process step S192. The process S180 then terminates.

If the process S180 determines at process step S184 that the track number is odd, it proceeds to decision step S198, where it queries if the off track range is positive. If so, the process proceeds to process step S200, where it calculates the X burst. Based on the X burst, a position offset signal is calculated by the DSP 136, as shown in process step S202. Using the position offset signal thus calculated, the servo controller 132 directs the actuator arm assembly 108 to move the head 110 in the required direction and by the calculated amount, as shown in process step S192. The process S180 then terminates.

If the process S180 determines at decision step S198 that the off track range is negative, it proceeds to process step S204, where it calculates the Y burst. Based on the Y burst, a position offset signal is calculated, as shown in process step S206. Using the position offset signal thus calculated by the DSP 136, the servo controller 132 directs the actuator arm assembly 108 to move the head 110 in the required direction and by the calculated amount, as shown in process step S192. The process S180 then terminates.

The present invention thus provides a method and apparatus for providing servo information which varies monotonically with respect to distance from the center of the track. As a result, specific and accurate position offset signals for a head may be obtained and alignment of the head with the track center may be accurately performed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a housing;

an actuator arm mounted to said housing;

a head mounted to said actuator arm;

a spin motor mounted to said housing; and a disk attached to said spin motor, said disk having a plurality of tracks, one of said tracks having a servo field with a plurality of servo bits, wherein the servo bits include an A bit, a B bit, a C bit and a D bit, where the A bit and the B bit have a common boundary located at the track centerline and where the C bit and the D bit have a common boundary; and a servo controller coupled to said head for controlling reading of the servo bits, said servo controller generating a servo signal based on (1) a selected one of a sum or a difference of (a) the difference between the A and the B bits and (b) the difference between the C and the D bits, and (2) an offset, the plurality of servo bits used for positioning said head.

2. The hard disk drive as recited in claim 1, wherein said offset is representative of the magnitude of the difference between the C and the D bits.

3. The hard disk drive as recited in claim 1, wherein said offset is subtracted from said selected one of a sum or a difference of (a) the difference between the A and the B bits and (b) the difference between the C and the D bits.

4. The hard disk drive as recited in claim 1, wherein said offset is added to said selected one of a sum or a difference of (a) the difference between the A and the B bits and (b) the difference between the C and the D bits.

5. The hard disk drive as recited in claim 1, wherein the servo bits are located on an even numbered track.

6. The hard disk drive as recited in claim 1, wherein the servo bits are located on an odd numbered track.

7. A hard disk drive, comprising:

a housing;

an actuator arm mounted to said housing;

a head mounted to said actuator arm;

a spin motor mounted to said housing; and a disk attached to said spin motor, said disk having a plurality of tracks, each of said plurality of tracks having a track position, one of said tracks having a servo field with a plurality of servo bits, wherein the servo bits include an A bit, a B bit, a C bit and a D bit, where the A bit and the B bit have a common boundary located at the track centerline and where the C bit and the D bit have a common boundary; and a servo controller coupled to said head for controlling reading of the servo bits, said servo controller generating a servo signal based on (1) a selected one of a sum or a difference of (a) the difference between the A and the B bits, and (b) the difference between the C and the D bits, (2) an offset, (3) the track position and (4) an off-track range of said head, the plurality of servo bits used for positioning said head.

8. The hard disk drive as recited in claim 7, wherein said offset is representative of the magnitude of the difference between the C and the D bits.

9. The hard disk drive as recited in claim 7, wherein said offset is subtracted from said selected one of a sum or a difference of (a) the difference between the A and the B bits and (b) the difference between the C and the D bits.

10. The hard disk drive as recited in claim 7, wherein said offset is added to said selected one of a sum or a difference of (a) the difference between the A and the B bits and (b) the difference between the C and the D bits.

11. The hard disk drive as recited in claim 7, wherein said track position corresponds to a selected one of an even numbered or an odd numbered track.

12. The hard disk drive as recited in claim 7, wherein said off-track range is a range selected from a group consisting of an off-track position of between −0% to −75%, and an off-track position of between +0% to +75%.

13. A method for controlling a head mounted on a hard disk drive arm comprising the steps of:

providing a disk attached to a hard disk drive assembly, said disk having a plurality of tracks, one of said tracks having a servo field with an A bit, a B bit, a C bit and a D bit, where the A bit and the B bit have a common boundary located at the track centerline and where the C bit and the D bit have a common boundary;

reading the plurality of servo bits;

generating a servo signal based on (1) a selected one of a sum or a difference of (a) the difference between the A and the B bits and (b) the difference between the C and the D bits, and (2) an offset; and positioning the hard disk drive arm in accordance with the servo signal.

14. The method as recited in claim 13, wherein in the step of generating the servo signal, the offset is representative of the magnitude of the difference between the C and the D bits.

15. The method as recited in claim 13, wherein the step of generating the servo signal further comprises the step of subtracting the offset from the selected one of a sum or a difference of (a) the difference between the A and the B bits and (b) the difference between the C and the D bits.

16. The method as recited in claim 13, wherein the step of generating the servo signal further comprises the step of adding the offset to the selected one of a sum or a difference of (a) the difference between the A and the B bits and (b) the difference between the C and the D bits.

17. A method for controlling a head mounted on a hard disk drive arm comprising the steps of:

providing a disk attached to a hard disk drive assembly, said disk having a plurality of tracks, each of said plurality of tracks having a track position, one of said tracks having a servo field with an A bit, a B bit, a C bit and a D bit, where the A bit and the B bit have a common boundary located at the track centerline and where the C bit and the D bit have a common boundary;

reading the plurality of servo bits;

generating a servo signal based on (1) a selected one of a sum or a difference of (a) the difference between the A and the B bits, and (b) the difference between the C and the D bits, (2) an offset, (3) the track position and (4) an off-track range of said head; and positioning the hard disk drive arm in accordance with the servo signal.

18. The method as recited in claim 17, wherein in the step of generating the servo signal the offset is representative of the magnitude of the difference between the C and the D bits.

19. The method as recited in claim 17, wherein the step of generating the servo signal further comprises one of a selected step of (1) subtracting the offset from the selected one of a sum or a difference of (a) the difference between the A and the B bits and (b) the difference between the C and the D bits; or (2) adding the offset to the selected one of a sum or a difference of (a) the difference between the A and the B bits and (b) the difference between the C and the D bits.

20. The method as recited in claim 17, wherein in the step of generating the servo signal, said off-track range is a range selected from a group consisting of an off-track position of between −0% to −75%, and an off-track position of between +0% to +75%.

* * * * *